UNITED STATES PATENT OFFICE.

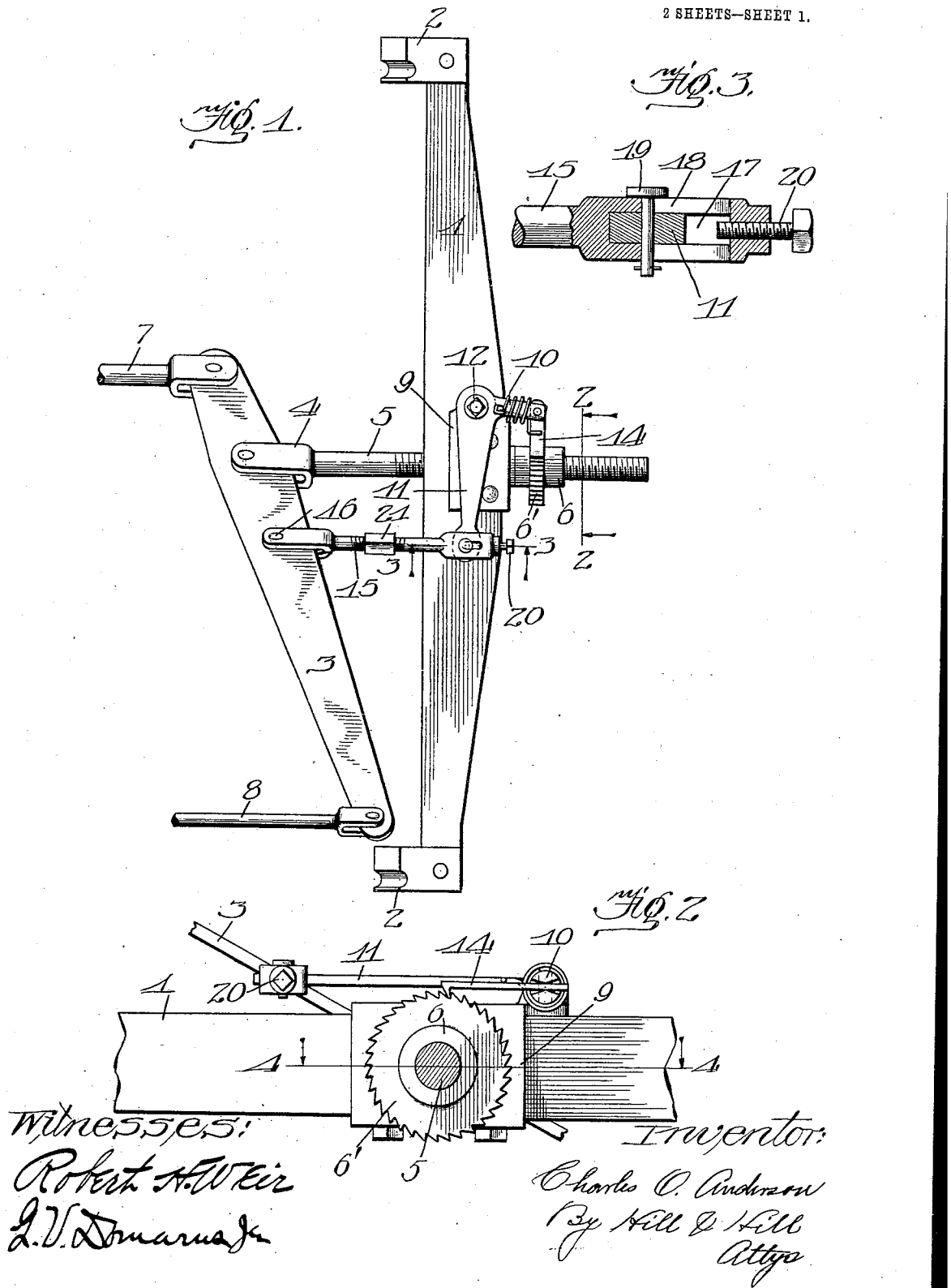

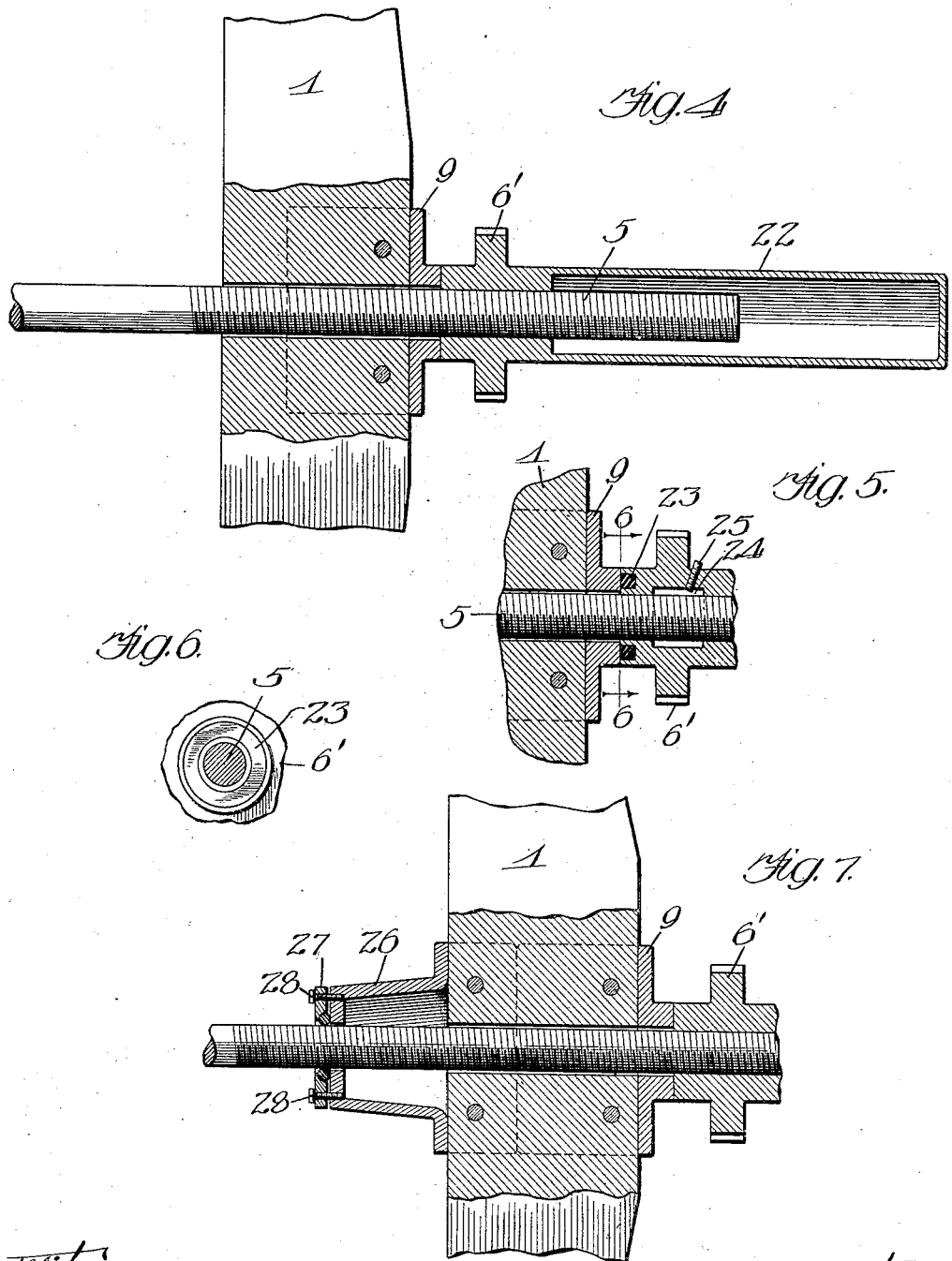

CHARLES O. ANDERSON, OF OMAHA, NEBRASKA, ASSIGNOR OF ONE-HALF TO A. T. AUSTIN, OF OMAHA, NEBRASKA.

AUTOMATIC SLACK-ADJUSTER.

No. 910,262.	Specification of Letters Patent.	Patented Jan. 19, 1909.

Application filed October 30, 1907. Serial No. 399,963.

*To all whom it may concern:*

Be it known that I, CHARLES O. ANDERSON, a citizen of the United States, residing at Omaha, county of Douglas, and State of Nebraska, have invented certain new and useful Improvements in Automatic Slack-Adjusters, of which the following is a description.

My invention relates to means for adjusting the coöperating parts, or "taking up the slack", of a brake mechanism to compensate for wear, the natural looseness of the joints, and the distortion of the parts incident to practical operation.

The object of my invention is to provide a simple, reliable, and durable device of the kind described, and one requiring little or no attention, except when it becomes necessary to renew the brake shoes.

To this end my invention consists in the novel construction, arrangement, and combination of parts, herein shown and described and more particularly pointed out in the claims.

In the accompanying drawings wherein like or similar reference characters indicate like or corresponding parts: Figure 1, is a plan view of a portion of a brake rigging equipped with my device; Fig. 2, is an enlarged section taken substantially on line 2—2 of Fig. 1; Fig. 3, is an enlarged section taken substantially on line 3—3 of Fig. 1. Fig. 4 is a section taken substantially on line 4—4 of Fig. 2 showing a slight modification. Fig. 5, is a section similar to that shown in Fig. 4 showing another slight modification. Fig. 6, is a section taken substantially on line 6—6 of Fig. 5. Fig. 7, is a section similar to that shown in Fig. 4 showing another slight modification.

In the preferred form of my device shown in the drawings 1, is a brake beam of the usual or any preferred construction attached to the vehicle in the usual or any desired manner. Suitable brake shoes 2—2 are provided at the opposite ends of the beam 1, of the usual or any preferred form to engage the wheels of the vehicle. The operating lever 3 is pivotally connected to the beam 1 by a clevis or equivalent means provided with a threaded extension 5 adapted to fit a suitable aperture near the center of the beam 1 and protrude on the opposite side. A nut 6 or equivalent means is fitted to the stem 5 adapted to engage one face of the beam and control the distance between the beam and lever as shown, so that by adjusting the position of the nut upon the stem the relative position of the lever and beam may be changed as desired.

In the drawings the lever 3, is shown, as the live lever of a brake mechanism of substantially the usual form, and arrangement, connected at its lower end by the usual bottom rod 7, to other portions of the brake mechanism, and at its upper end by a rod 8 to the brake operating mechanism, which may be either hand, or power operated, or a combination of both as desired, the whole being preferably arranged in substantially the usual manner.

Obviously as the brake shoes wear away in service a greater movement of the lever 3 is required to set the brakes, and my present invention is for the purpose of automatically adjusting the relative positions of the brake beam and lever to compensate for such wear and avoid any perceptible variation in the movements of the lever in operating the brakes, such adjustment being accomplished by controlling the position of the nut 6 upon the stem 5.

Any suitable means may be provided for adjusting the position of the nut by the excessive movement of the lever 3. In the form shown, the nut 6 is in the form of a ratchet wheel having threads upon its central opening, that is, it is provided with a concentric circular flange $6^1$ near its center, provided with suitable ratchet teeth upon its periphery. Supplemental connecting means are provided between the lever 3 and beam 1 arranged to engage the teeth above described and rotate the nut 1 at each excessive movement of the lever 3.

As shown, a plate 9, is provided upon the beam 1 adapted to serve as a washer against which the nut 6 may draw, and also as a base upon which other portions of the mechanism may be mounted. In the drawings, a bell crank 10—11 is shown pivotally mounted upon the base 9 as at 12 with its arm 10 extending longitudinally of the stem and provided at its extremity with a spring actuated pawl 14 adapted to engage the teeth upon the nut or ratchet wheel 6 to rotate the same at each excessive oscillation of the bell crank.

The arm 11 of the bell crank may be connected to the lever 3 in any suitable manner. As shown, a bar 15 is attached to the lever 3 as at 16 and extends to the free end of the arm 11 where it may be attached in any desirable manner. In the preferred construction shown this connection is so arranged that movement will be imparted to the arm 11 only when the movement of the lever 3 exceeds its normal travel for this purpose the extremity of the bar 15 is provided with a slot 17 adapted to receive the end of the arm 11 and with a second slot 18 at substantially right angles to the plane of the slot 17 to recieve a pin 19 or other suitable means upon the arm 11 to retain the arm and bar 15 in engagement.

The slot 17 is of sufficient length to permit the normal movement of the lever 3 without actuating the bell crank 10—11 sufficiently to move the pawl 14 the distance between the adjacent teeth upon the ratchet wheel 6. When the movement of the lever 3 becomes excessive it is obvious that the end of the slot 17 will engage the arm 11 and operate the arm 10 sufficiently to move the pawl 14 past a tooth upon the ratchet wheel 6 thus rotating the wheel one or more teeth, as the case may be, at each movement of the lever 3. In the form shown, a set screw 20 is provided in the extremity of the bar 15 with its end extending into the slot 17 into a position to engage the arm 11 and thus adjust the operation of the mechanism.

Obviously the mechanism above described may be arranged to rotate the ratchet 6 upon either the operative or return movement of the lever 3 but as the parts of the mechanism are in tension during a portion of the operative movement of the lever, I prefer to arrange the mechanism so that at each operative movement of the lever 3, the pawl 14 will be moved into operative position, and during the return movement of the lever the pawl will be moved to engage a tooth of the ratchet and partially rotate the same, thus insuring the adjustment of the parts while the same are not under tension.

In the preferred construction also a turnbuckle 21 is provided in the rod 15, or other suitable means for adjusting the normal position of the bell crank 10—11 so that as the distance between the brake beam and lever 3 changes, the length of the rod 15 may be, from time to time, adjusted to preserve the proper relation between the pawl 14 and the ratchet wheel.

In the form shown in Fig. 4, the ratchet wheel 6 is provided with an extension 22 upon its hub adapted to inclose the projecting end of the extension 5 to protect the same from dirt, moisture, and the like. Obviously if desired the interior of this extension 22 may be partially filled with oil or other suitable material so that the threads upon the extension 5 will be lubricated and thus prevent the liability of the parts becoming rusty or sticking in position.

In Fig. 5, in order to more thoroughly protect the extension 5 an annular groove 23 is provided in the face of the hub of the ratchet 6, adapted to be filled with a suitable resilient packing material which will press against the face of the plate 9 when the parts are in operative position thus preventing the entrance of moisture or other foreign matter between the hub of the ratchet and the plate 9. Where the extension 22 is provided, and used as a receptacle for oil, the packing 23 also operates to prevent the escape of the oil at this point. In this form if desired a chamber 24 may be provided near the center of the hub of the ratchet 6, into which oil may be introduced by means of an opening 25 or equivalent means which is preferably plugged or otherwise closed at its outer end in any suitable manner, thus still further lessening the probabilities of the parts becoming rusted or otherwise stuck in position, and insuring their thorough lubrication.

In Fig. 7 the threaded extension 5 is still more carefully protected. In this form a sleeve 26 is provided upon the brake beam 1 on the side opposite the ratchet wheel 6 in position to inclose a portion of the extension 5. Upon the face of the sleeve 26 an annular disk 27 is mounted by means of suitable cap screws 28—28, or equivalent means, adapted to control the relative position of the disk upon the sleeve. The inner face of the disk is suitably formed to engage a ring of resilient packing material, or other suitable means, and force the same toward the extension 5, thus providing a fluid tight joint at this point so that the interior of the sleeve 26, as well as the opening through the brake beam 1 for the extension 5 may be filled with oil or other suitable lubricant, thus insuring the proper lubrication of this portion of the extension as well as protecting it from moisture, dirt or other foreign material.

Obviously by combining the three forms shown in Figs. 4, 5 and 7 the entire threaded portion of the extension 5 may be protected and thoroughly lubricated, thus insuring the free and proper operation of the device.

The operation of my device is believed to be sufficiently described in the foregoing specification and further detailed description is unnecessary.

Having thus described my improvement, it is obvious that various immaterial modi- fications may be made in my device without departing from the spirit of my invention, hence I do not wish to be understood as limiting myself to the exact form and construction shown.

What I claim as new and desire to secure by Letters Patent is:—

1. In a device of the kind described, a pair of brake rigging members, a clevis provided with a threaded stem for connecting said members, and a nut arranged to coöperate with said stem to control the distance between said members, in combination with means attached to said members arranged to automatically adjust the position of said nut by excessive movement between said members.

2. In a device of the kind described, a pair of coöperating movable brake rigging members, a clevis provided with a threaded stem for connecting said members, and a nut arranged to coöperate with said stem to control the distance between said members, in combination with means attached to said members arranged to automatically adjust the position of said nut by excessive movement between said members.

3. In a device of the kind described, a pair of brake rigging members, a clevis provided with a threaded stem for pivotally connecting said members, and a nut arranged to coöperate with said stem, to control the distance between said members, in combination with means extending between said members arranged to automatically adjust the position of said nut by excessive movements between said members.

4. In a device of the kind described, a pair of brake rigging members, a clevis provided with a threaded stem for connecting said members, and a ratchet wheel provided with a central opening arranged to coöperate with said stem to control the distance between said members, in combination with means extending between the members, arranged to automatically adjust the position of said ratchet wheel by excessive movement between said members.

5. In a device of the kind described, a pair of brake rigging members, a clevis provided with a threaded stem for connecting said members, and a nut arranged to coöperate with said stem to control the distance between said members, in combination with a bell crank mounted upon one of said members, means upon one arm of said bell crank adapted to engage said nut to rotate the same, and means connecting the other arm to the other of said members, and arranged to automatically adjust the position of said nut by excessive movement between said members.

6. In a device of the kind described, a pair of brake rigging members, comprising a brake beam and an operating lever, a clevis provided with a threaded stem for connecting said members, and a nut arranged to coöperate with said stem to control the distance between said members, in combination with supplemental connecting means between said members arranged to automatically adjust the position of said nut by excessive movement between said members.

7. In a device of the kind described, a pair of movable coöperating brake rigging members, a clevis provided with a threaded stem for pivotally connecting said members, and a ratchet wheel arranged to coöperate with said stem to control the distance between said members, in combination with supplemental connecting means extending between said members arranged to automatically adjust the position of said ratchet wheel by excessive movement between said members.

8. In a device of the kind described, a pair of movable coöperating brake rigging members, a clevis provided with a threaded stem for pivotally connecting said members and a ratchet wheel provided with a threaded central opening arranged to coöperate with said stem to control the distance between said members, in combination with supplemental connecting means extending between said members arranged to automatically adjust the position of said ratchet wheel by excessive movement between said members.

9. In a device of the kind described, a pair of movable brake rigging members, a clevis provided with a threaded stem for pivotally connecting said members, and a ratchet wheel provided with a threaded central opening arranged to coöperate with said stem to control the distance between said members, in combination with a bell crank mounted upon one of said members means provided upon one arm of said bell crank adapted to engage said ratchet wheel and rotate the same, and means connecting the other arm to the other of said members and arranged to automatically adjust the position of said ratchet wheel by excessive movement between said members.

10. In a device of the kind described, a pair of movable brake rigging members comprising a brake beam, and an operating lever, a clevis provided with a threaded stem for pivotally connecting said members, and a ratchet wheel provided with a threaded central opening arranged to coöperate with said stem to control the distance between said members, in combination with a bell crank mounted upon one of said members with means provided upon one arm of said bell crank adapted to engage said ratchet wheel to rotate the same, and means connecting the other arm to the other of said members and arranged to automatically adjust the position of said ratchet wheel by excessive movement between said members.

11. In a device of the kind described, a pair of brake rigging members comprising a brake beam, and an operating lever, a clevis provided with a threaded stem for pivotally connecting said members, and a ratchet wheel provided with a threaded central opening arranged to coöperate with said stem to control the distance between said members, in combination with a bell crank mounted upon one of said members, means provided upon one arm of said bell crank adapted to engage said ratchet wheel and rotate the same and means connecting the other arm to the other of said members and arranged to automatically adjust the position of said ratchet wheel by excessive movement between said members.

12. In a device of the kind described, a pair of brake rigging members comprising a brake beam, and an operating lever, a clevis provided with a threaded stem for connecting said members, and a ratchet wheel provided with a threaded central opening arranged to coöperate with said stem to control the distance between said members, in combination with a bell crank mounted upon one of said members, means provided upon one arm of said bell crank adapted to engage said ratchet wheel to rotate the same, and means connecting the other arm to the other of said members and arranged to automatically adjust the position of said ratchet wheel by excessive movement between said members.

13. In a device of the kind described, a pair of brake rigging members comprising a brake beam, and an operating lever, a clevis provided with a threaded stem for connecting said members, and a nut arranged to coöperate with said stem to control the distance between said members, in combination with a bell crank mounted upon said members, means provided upon one arm of said bell crank adapted to engage said nut to rotate the same, and means connecting the other arm to the other of said members, and arranged to automatically adjust the position of said nut by excessive movement between said members.

14. In a device of the kind described, a pair of brake rigging members comprising a brake beam, and an operating lever, a clevis provided with a threaded stem for connecting said members, and a ratchet wheel provided with a threaded central opening arranged to coöperate with said stem to control the distance between said members, in combination with supplemental connecting means extending between said members arranged to automatically adjust the position of said ratchet wheel by excessive movement between said members.

15. In a device of the kind described, a pair of brake rigging members comprising a brake beam, and an operating lever, a clevis provided with a threaded stem for pivotally connecting said members, and a nut arranged to coöperate with said stem to control the distance between said members, in combination with supplemental connecting means extending between said members to automatically adjust the position of said nut by excessive movement between the members.

16. In a device of the kind described, a pair of brake rigging members, a clevis provided with a threaded stem for pivotally connecting said members, and a nut arranged to coöperate with said stem to control the distance between said members, in combination with a bell crank mounted upon one of said members, means provided upon one arm of said bell crank adapted to engage said nut to rotate the same, and means connecting the other arm to the other of said members and arranged to automatically adjust the position of said nut by excessive movement between said members.

17. In a device of the kind described, a pair of movable brake rigging members comprising a brake beam and an operating lever, a clevis provided with a threaded stem for connecting said members, and a ratchet wheel arranged to coöperate with said stem to control the distance between said members, in combination with supplemental connecting means extending between said members arranged to automatically adjust the position of said ratchet wheel by any excessive movement between said members.

18. In a device of the kind described, a pair of movable coöperating brake rigging members, a clevis provided with a threaded stem for connecting said members, and a nut arranged to coöperate with said stem to control the distance between said members, in combination with a bell crank mounted upon one of said members, means provided upon one arm of said bell crank adapted to engage said nut to rotate the same, and means connecting the other arm to the other of said members and arranged to automatically adjust the position of said nut by excessive movement between said members.

19. In a device of the kind described, a pair of brake rigging members, a clevis provided with a threaded stem connecting said members, and a nut arranged to coöperate with said stem to control the distance between said members, in combination with a bell crank mounted upon one of said members, with means provided upon one of its arms to engage said nut to rotate the same, and a rod pivotally connected to the other member and loosely and slidably attached to the free arm of the bell crank adapted to operate the same to rotate said nut only by excessive movement between said members.

20. In a device of the kind described, a pair of brake rigging members comprising a brake beam and a lever for operating the same, a clevis provided with a threaded stem connecting said members, and a nut arranged to coöperate with said stem to control the distance between said members, in combination with a bell crank mounted upon said brake beam with means provided upon one of its arms to engage said nut to rotate the same and a rod pivotally connected to said operating lever and loosely and slidably attached to the free arm of the bell crank, adapted to operate the same only by excessive movement between said members.

21. In a device of the kind described, a pair of brake rigging members comprising a brake beam and a lever for operating the same, a clevis provided with a threaded stem connecting said members, and a ratchet wheel provided with a threaded central opening arranged to coöperate with said stem to control the distance between said members, in combination with a bell crank mounted upon said brake beam, with a pawl provided upon one of its arms to engage said ratchet wheel to rotate the same, and a rod pivotally connected to said operating lever and loosely and slidably attached to the free arm of the bell crank adapted to operate the same to rotate said ratchet wheel only by excessive movement between said members.

22. In a device of the kind described, a pair of coöperating movable brake rigging members comprising a brake beam, and a lever for operating the same, a clevis provided with a threaded stem connecting said members, and a ratchet wheel provided with a threaded central opening arranged to coöperate with said stem to control the distance between said members, in combination with a bell crank mounted upon said brake beam with a pawl provided upon one of its arms to engage said ratchet wheel to rotate the same, and a rod pivotally connected to said operating lever and loosely and slidably attached to the free arm of the bell crank adapted to operate the same to rotate said ratchet wheel only by excessive movement between said members.

23. In a device of the kind described, a pair of brake rigging members, a clevis provided with a threaded stem for connecting said members, and a nut arranged to coöperate with said stem to control the distance between said members, in combination with means attached to said members arranged to automatically adjust the position of said nut by excessive movement between the members and a casing arranged to inclose a portion of said stem.

24. In a device of the kind described, a pair of brake rigging members, a clevis provided with a threaded stem for connecting said members and a nut arranged to coöperate with said stem, to control the distance between said members, in combination with means attached to said members arranged to automatically adjust the position of said nut by excessive movement between the members, and a fluid tight casing inclosing a portion of said stem and provided with means for preventing the escape of fluid at the entrance to said casing.

In testimony whereof, I have hereunto signed my name in the presence of two subscribing witnesses.

CHARLES O. ANDERSON.

Witnesses:
BURTON U. HILLS,
CHARLES I. COBB.